United States Patent
Shrestha

(10) Patent No.: US 11,625,208 B2
(45) Date of Patent: Apr. 11, 2023

(54) PORTABLE PRINTER SETTINGS SYSTEM

(71) Applicant: Kyocera Document Solutions Inc., Osaka (JP)

(72) Inventor: Shaileesha Shrestha, Huntington Beach, CA (US)

(73) Assignee: Kyocera Document Solutions Inc., Osaka (JP)

( * ) Notice: Subject to any disclaimer, the term of this patent is extended or adjusted under 35 U.S.C. 154(b) by 177 days.

(21) Appl. No.: 17/192,261

(22) Filed: Mar. 4, 2021

(65) Prior Publication Data

US 2022/0283761 A1 Sep. 8, 2022

(51) Int. Cl.
*G06F 3/12* (2006.01)

(52) U.S. Cl.
CPC ............ *G06F 3/1253* (2013.01); *G06F 3/121* (2013.01); *G06F 3/1205* (2013.01); *G06F 3/1292* (2013.01); *G06F 3/1204* (2013.01)

(58) Field of Classification Search
CPC ...... G06F 3/1253; G06F 3/1205; G06F 3/121; G06F 3/1292; G06F 3/1204
USPC ....................................................... 358/1.15
See application file for complete search history.

(56) References Cited

U.S. PATENT DOCUMENTS

| | | | |
|---|---|---|---|
| 4,027,764 A * | 6/1977 | Kashio | B41J 7/96 400/157.2 |
| 7,340,686 B2 | 3/2008 | Matthews et al. | |
| 8,010,523 B2 | 8/2011 | Djabarov | |
| 10,444,848 B2 | 10/2019 | Sirpal et al. | |
| 2004/0086284 A1* | 5/2004 | Endo | B41J 11/006 399/10 |
| 2012/0224197 A1* | 9/2012 | Suzuki | G06K 15/4005 358/1.9 |
| 2020/0293235 A1* | 9/2020 | Chew | G06F 3/1205 |

* cited by examiner

*Primary Examiner* — Darryl V Dottin
(74) *Attorney, Agent, or Firm* — Millen, White, Zelano & Branigan, P.C.; William Nixon

(57) ABSTRACT

A system for error reporting in a printing device. The system includes a printing device having components configured to display a list of saved printer settings interfaces, which may be public or user account-specific. The printing device displays a user selected printer settings interface from the list. This may include the prepopulating of preferred settings for various printer settings associated with the interface. When errors occur during printing, an error report including the printer settings is provided to a network support resource to enable rapid detection of the cause of the error.

20 Claims, 10 Drawing Sheets

| Error Code | Date | Description | F/W Version | Settings |
|---|---|---|---|---|
| C0001 | Dec. 15, 2020 | Hardware errors | 1.0 | XXXX |
| C0002 | Dec. 15, 2020 | Fuser Issue | 1.1 | XXXY |
| CF001 | Dec. 27, 2020 | Misprint | 1.1 | XXXZ |
| CF002 | Dec. 20, 2020 | Color Correction | 1.0 | AABB |
| CM001 | Dec. 28, 2020 | OS Crash | 1.2 | BBBB |

Fig. 7

PORTABLE PRINTER SETTINGS SYSTEM

FIELD OF INVENTION

The technical subject matter of this application relates generally to the field of printing device user interfaces. Specifically, the claimed subject matter relates to printer user interfaces that may be stored in association with accounts and ported between printing devices.

BACKGROUND

Systems have been created to enable user interaction with printing devices. These systems often provide a control panel on the exterior of the printing device so that users can identify and modify printer settings. Settings are often displayed in nested user interfaces, each user interface screen displaying a collection of related settings. Users navigate through the user interfaces and select desired printer settings options via buttons, touchscreen, or other input means. As printing devices continue to increase in complexity, offering ever increasing numbers of features, user interfaces also grow in volume and complexity.

SUMMARY

Various embodiments are directed to a system for improving error reporting using portable printer interface management. The saving of printer settings interfaces with preferred printer settings states may enable the provision of same with an error reporting that occurs after a technical failure.

One embodiment of the invention is a printing device including a processor, a display, an input device, a network communication interface, and a computer readable medium, coupled to the processor, the computer readable medium comprising code, executable by the processor. The code may cause the processor to implement the steps of displaying, by the display, a list of printer settings interfaces. Code execution may result in receiving, via the input device, a selection of one or more of the printer settings interfaces in the list and displaying, by the display, the selected printer settings interface including configurable options for controlling output of the printing device. Code execution may further cause identifying, via the processor, a selection of one or more configurable options within the selected printer settings interface and generating, by the processor, output for printing based, at least in part on the received configurable options. Further, the code may cause detecting, by the processor, an error in the output of the printing device, and transmitting, by the network communication interface, an error report including the selected printer settings interface and the received configurable options to a network support resource.

Another embodiment of the invention is a method including displaying, by a display of a printing device, a list of printer settings interfaces and receiving, via an input device of the printing device, a selection of one or more printer settings interfaces in the list. The method may include displaying, by the display, the selected printer settings interface including configurable options for controlling output of the printing device. The method may also include identifying, via a processor of the printing device, a selection of one or more configurable options within the selected printer settings interface and generating, by a processor of the printing device, output for printing based, at least in part on the received configurable options. Further, the method includes detecting, by the processor, an error in the output of the printing device, and transmitting, by a network interface of the printing device, an error report including the selected printer settings interface and the received configurable options to a network support resource.

Another embodiment of the invention is directed to a printing device including a processor, a display, a network interface, an input device, a computer readable medium, coupled to the processor, the computer readable medium comprising code, executable by the processor. The code may cause receiving, via the input device, a selection of a public list of printer settings interfaces or an account-specific list of printer settings interfaces, wherein each of the printer settings interfaces in the public list is stored in the computer readable medium in association with the public list, in response to receiving a request to store the printer settings interface being displayed at the time of the request, and wherein the account-specific list of printer settings interfaces is associated with a user account, and each of the printer settings interfaces in the account-specific list is stored in a memory in association with the account-specific list, in response to receiving a request initiated by a user logged into the user account, to store the printer settings interface being displayed at the time of the request. The code may also cause displaying, by the display, a selected list of printer settings interfaces and receiving, via the input device, a selection of one or more of the printer settings interfaces in the list. The code may cause displaying, by the display, the selected printer settings interface including configurable options for controlling output of the printing device. The code may also cause identifying, via the processor, a selection of one or more configurable options within the selected printer settings interface and generating, by the processor, output for printing based, at least in part on the received configurable options. Further, the code may cause detecting, by the processor, an error in the output of the printing device; and transmitting, by the network interface, an error report including the selected printer settings interface and the received configurable options to a network support resource.

Additional details regarding the specific implementation of these embodiments can be found in the Detailed Description and the Figures.

BRIEF DESCRIPTION OF THE DRAWINGS

FIG. 7 shows a block diagram illustrating an exemplary error report for a technical failure incident according to an embodiment.

DETAILED DESCRIPTION

Figure 1:
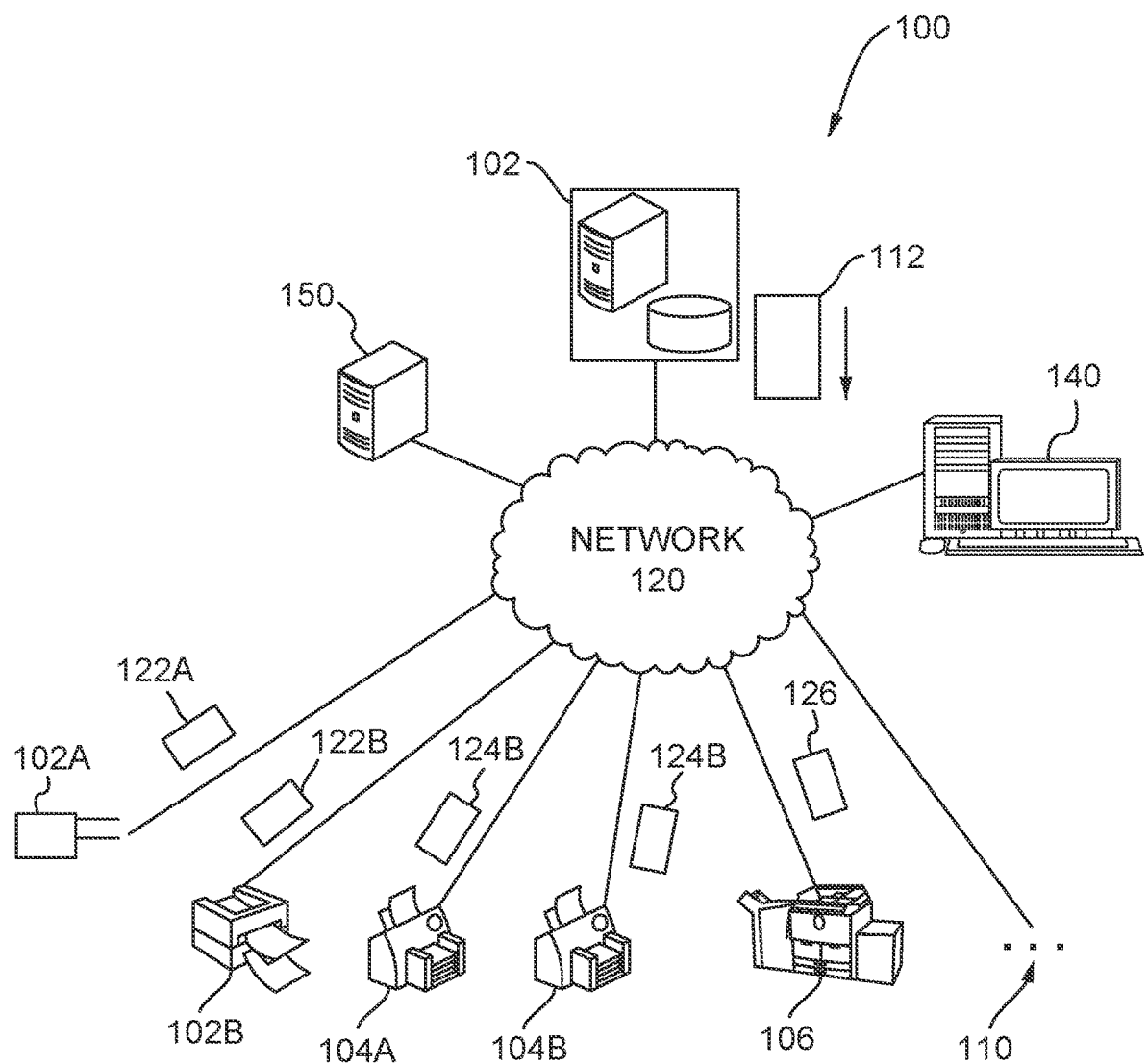
FIG. 1 shows a block diagram of a network printing environment according to an embodiment.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

Prior to discussing embodiments of the invention, some terms can be described in further detail.

A "user computing device" may be any suitable computing device that can interact with a user. User computing devices may be in any suitable form. Some examples of user computing devices include cellular phones, PDAs, personal computers (PCs), tablet computers, and the like A "printing device" (sometimes referred to as a printer) may comprise any suitable electronic device that use to generate a physical representation of a digital data. A printing device may communicate over a network via Ethernet, Wi-Fi, Bluetooth, Bluetooth Low Energy (BLE), or any other communication medium that may provide access to a network such as the Internet or a private network. A printing device may communicate with other printing devices, a print server, a user account storage, user access devices, and other network hardware to facilitate printing functions Examples of mobile devices include laser printers, ink jet printers, 3-D printers, copies, etc. A printing device may comprise any suitable hardware and software for performing such functions. For example, a printing device may have a display for providing settings information and status information to users, as well as one or more input devices for receiving user selections.

A "printer settings interface" can be any suitable user interface that provides a printing device user with information about current configuration of a print job. A printer settings interface may display the configuration of nonadjustable settings. In addition, a printer settings interface may display one or more configurable options, which may be modified or adjusted by the printing device user via an input device such as a touchscreen, buttons, or key pad. Examples of configurable options include paper size, paper tray, print ratio, print orientation, collating, double-siding, stapling, etc. Printing devices may include multiple printer settings interfaces that may be nested as sub-interfaces in a tree hierarchy. Adjustment of some configurable options may require that a user navigate through one or more printer settings interfaces.

An "application" may be a computer program that is used for a specific purpose.

An "error report" may include any information surrounding or related to a printing device output error or technical failure. Error reports may include data related to the printing device error or technical failure. An error report may include information useful for identifying the cause of the printing device error or technical failure. For example, an error report may include details associated with one or more printer settings in place at the time of the technical failure. Other information included in the error report may include user account information, network address of the printing device that experienced the error, print job parameters, and other information useful in identifying the source of the error or technical failure. An error report may also be known as a technical support request, or support request.

A "credential" may be any suitable information that serves as reliable evidence of account ownership, user identity, or access authority. A credential may be a string of numbers, letters, or any other suitable characters, as well as any object or document that can serve as confirmation. Examples of credentials include identification cards, certified documents, access cards, passcodes and other login information, etc.

A "network support resource" may be an entity that can provide a support resource such as technical troubleshooting, error correction, technical maintenance, etc., typically through a network support resource computing device. Examples of a network support resource includes an information technology provider, technical support provider, network assistance provider, etc.

A "user" may include an individual or a computational device. In some embodiments, a user may be associated with one or more individual user accounts and/or mobile devices or personal computing devices. In some embodiments, the user may be an employee, contractor, or other person having authorized access to make use of a networked printing environment.

A "server computing device" is typically a powerful computer or cluster of computers. For example, the server computer can be a large mainframe, a minicomputer cluster, or a group of servers functioning as a unit. In one example, the server computer may be a database server and may be coupled to a Web server. The server computing device may also be referred to as a server computer or server.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable computer-readable device or devices that can store electronic data. A suitable memory may comprise a non-transitory computer readable medium that stores instructions that can be executed by a processor to implement a desired method. Examples of memories may comprise one or more memory chips, disk drives, removable memory, etc. Such memories may operate using any suitable electrical, optical, and/or magnetic mode of operation.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1.

Printing devices may use numerous settings to constrain printing operations. Printer settings may be toggled by users to enable user control over how print jobs are performed. Each printer setting may have different states such as on/off, bold/thin/no border, etc. Selection of a state for a printer setting may represent result in software operating on the printing device including an instruction to printing device. Components modify printing according to the selected state. The aggregation of all selected states for printer settings provides the printing device with instructions as to how a print job should be executed.

Printer settings are viewed and generally configurable via a printer settings interface. A printer settings interface is a user interface, such as a graphical user interface, which provides information about the current state of printer settings, as well as enabling modification of configurable printer settings options. A graphical user interface providing many options enables access to a number of printer settings interfaces. For example, a main menu interface includes options to access to printer settings interfaces of common or similar printer settings. Some printer settings interfaces may include buttons, links, or other means to access additional printer settings interfaces, i.e. sub-interfaces. Printer settings interfaces may be nested in a tree structure with the main menu as a top node. Some printer settings interfaces may be accessible from multiple other printer settings interfaces. That is, access to a printer settings interface may be attained from one or more other interfaces, forming a tree structure in which some nodes are connected across and within branches.

Configurable options may be printer settings that can be modified by a user, for the current print job. The requirements of some print jobs may restrict the states that may be selected for some options. For example, a print job associated with an oversized image may result in an automatic paper selection of a larger paper size unless the user selects a print ratio state less than 100%. Thus, printer settings may become configurable options during the state selection process, or may become nonadjustable as other configurable options are selected.

The number of configurable and nonadjustable options, i.e. printer settings, and associated printer settings interfaces, may be numerous increasing the likelihood of technical failure due to incompatible settings or misinterpreted instructions. Further the number of configurable options can make it difficult for users and technical support to identify the states of various printer settings at the time a technical failure occurs. Recreating and troubleshooting technical failures may be difficult if not impossible for technical support staff without actual knowledge of the specific states of printer settings in use at the time of technical failure.

The various embodiments disclosed herein enable improved error detection and reporting by providing a "snapshot" or saved profile of the state of printer settings at the time of a technical failure. Printer settings interfaces and the state of printer settings associated therewith, can be saved locally or distributed account-specific favorites list. Selection of a saved printer settings interface by a user results in the opening of that interface as well as the automatic selection of all saved printer settings states. When a selection of a saved printer settings interface is made, a timestamp or date stamp may be stored in association with the printer settings interface, to denote the last used or last accessed time for the printer settings interface. If a technical failure occurs during printing, a processor of the printing device may determine whether a saved printer settings interface was in use at the time of technical failure using the last used times for each saved printer settings interface. If a saved printer settings interface was in use at the time of the technical failure, the processor can generate an error report including the saved printer settings interface and associated states of the printer settings. Error reports can be generated via printing or electronically transmitted to a network support resource such as information technology (IT) or technical support. Because the printer settings interface and associated states of printer settings is stored in a memory prior to occurrence of a technical failure, the state of printer settings is not irreparably lost due to the failure.

Various embodiments may also improve the quality of user experience by reducing the difficulty of navigating to a desired printer settings interface. Printer settings interfaces including printer settings frequently used by users may be saved, with the preferred state of various settings. Future access to each saved printer settings interface can be obtained via a favorite's link, button, or other access means. Frequently used settings are easily accessed without requiring the user to navigating through the interface tree structure to reach nested interfaces. Further, saving of the preferred state of printer settings may reduce the likelihood that a user executes a print job without implementing all desired printer settings, which would result in a waste of printing material and the need to execute a second print job.

Embodiments include a list of printer settings interfaces saved or "favorited" by users. The list may be local to a specific printing device, including saved interfaces of users of that printing device. The list may be account-specific, including interfaces saved by a particular user. Networked printing environments enabling the association of user accounts to print jobs may provide the account-specific list of printer settings interfaces to a user at any applicable printing device within the printing environment. As such, a user account may have multiple account-specific lists of printer settings interfaces, or multiple favorites lists, each list applicable to and associated with a different model or make of printing device. Benefits to error reporting and user experience may thus be recognized across a networked printing environment.

Printer settings interfaces should be understood to be accessible at a printing device itself, or via an application running on a user computing device. For the simplicity of disclosure, embodiments are discussed herein with reference to use of a printer settings interface on a printing device. But, the described techniques for managing printer settings interfaces are applicable to user computing device uses as well.

Referring now to FIG. 1, there is shown a block diagram of a networked printing environment. The printing environment includes a system 100 of multiple printing devices coupled to a server 130 to manage the multiple printing devices. The server 130 may also manage one or more user accounts enabling access to the printing devices. System 100 includes printing devices connected to the server 130 via a network 120 such as a local area network (LAN), the Internet, or other suitable network. The printing devices include printing devices 102A, 102B, 104A, 104B, 106, and additional printing devices 110. Printing devices 102A and 102B may be similar device models while printing devices 104A and 104B also may be similar device models that differ from printing devices 102A and 102B. Printing device 106 may be a different model altogether. Additional printing devices may be associated with the different models. Further, system 100 may include additional models of printing devices not shown here for brevity.

A given printing device may be configured to perform one or more functions such as printing, scanning, emailing, storing, modifying, receiving, or transmitting one or more piece of data 112 such as documents or files. In some embodiments, each printing device may include hardware and software components associated with the execution of print jobs received from a user computing device 140 or server 130. The hardware and software components may provide for or enable the display of printer settings interfaces. The printer settings interfaces provide users of the printing devices with information about available printer settings. The hardware and software components may be further configured to receive user input about available printer settings and enable storage of any given printer settings interfaces and its associated printer settings.

Each printing device 102A, 102B, 104A, 104B, 106, and 110 may be configured to perform one or more steps, actions, or functions disclosed herein. For example, printing device 102A may communicate with any of server 130, user computing device 140, and network support resource computing device 150 to transmit or receive data, or information, 122A via network 120, including error codes, print counter values, time stamps, error intervals, mean time between failures (MTBF), mean count between failures (MCBF), error frequency codes, time intervals, numbers of printed pages, numbers of errors, print volume, user account, and other related information. Each printing device may send and receive its own data packages, as shown in FIG. 1. Data may be routed within system 100 using a protocol, such as TCP/IP, in that each device includes its own unique network address. Thus, printing device 102B may transmit or receive data 122B, printing device 104A may transmit or receive data 124A, printing device 104B may transmit or receive data 124B, and printing device 106 may transmit or receive data 126, and so on.

Server 130 may include a cloud-based server, for example, that can perform one or more tasks to manage or maintain printing devices within system 100. Server 130 may communicate with printing devices 102A, 102B, 104A, 104B, 106, and 110, as well as user computing device 140, and network support resource computing device 150 to transmit and receive data 112. In some embodiments, server 130 may transmit a command to one or more of the printing devices to print, reset, install updates, or perform one or more printing or maintenance functions or operations. In other embodiments, server 130 may receive data from one or more printing devices, shown as data 122A-126, such as user account credentials, user account information, error codes, print counter values, time stamps, error intervals, mean time between failures (MTBF), mean count between failures (MCBF), error frequency codes, time intervals, numbers of printed pages, numbers of errors, print volume, and other related information.

Server 130 may include one or more user account databases. In a networked printing environment such as that of system 100, permission to generate and modify print jobs may be accessible to all members of the public or may be restricted by user account status. A user account database may include user account names and credentials, e.g. passwords, access tokens, PINs, etc., preferences, recent print jobs, recently used printers, error reports, printer settings interface favorites lists, and the like. New print jobs may be generated at a user computing device 140, transmitted to server 130, spooled in association with a user account of the generating user. A user may then access any of printing devices 102A, 102B, 104A, 104B, 106, and 110, enter user credentials, which are transmitted to server 130. The spooled print job is transmitted by server 130 to the selected printing device. Along with the spooled print job, a list of favorite or frequently used printer settings interfaces associated with the user in the user account database, may be transmitted to the selected printing device. The user may opt to select a saved printer settings interface, resulting in the display of the interface and any saved printer settings. The user may adjust the printer settings as desired and initiate execution of the print job by the selected printing device.

Server 130 may include one or more computing devices or systems. It also may be consolidated into a single physical location or distributed across two or more physical locations. Analytical server 130 may include hardware, software, or firmware configured to perform one or more functions disclosed below. Analytical server 130 is disclosed in greater detail by FIG. 3.

User computing device 140 may be a personal computing device such as a desktop computer, laptop, tablet, terminal computer, and may transmit data and information such as print jobs, printing instructions, printer settings information, and error reports over the network 120. In some embodiments, user of the system 100 may generate a print job at user computing device 140 and transmit it to server 130 for spooling or directly to any of printing devices 102A, 102B, 104A, 104B, 106, and 110 for printing.

Network support resource computing device 150 is associated with a network support service such as technical support, quality assurance, information technology, etc. The network support resource computing device may be a server device configured to receive, organize, and maintain error reports in a database. The network support resource computing device 150 may also include one or more computing devices, such as desktop computers, laptops, tablets, terminal computers or the like, by which network support staff may access and review the error reports stored in the database of the network support resource server. Entries in the error reporting database may be modified, updated, or adjusted via one of the computing devices. Thus, the network support resource computing device 150 may be a server device or may comprise a collection of computing devices configured to support error troubleshooting and quality assurance. The network support resource computing device may receive error reports via the network 120 from any of the printing devices 102A, 102B, 104A, 104B, 106, and 110, the server 130, or the user computing device 140, according to the particular system 100 configuration.

Network 120 in system 100 may include one or more wired or wireless connections that support communication between the devices of system 100. In some embodiments, network 120 may support one or more communication protocols, such as Extensible Messaging and Presence Protocol (XMPP), File Transfer Protocol (FTP), HyperText Transport Protocol (HTTP), Java Message Service (JMS), Simple Object Access Protocol (SOAP), Short Message Service (SMS), Simple Mail Transfer Protocol (SMTP), Simple Network Management Protocol (SNMP), Transmission Control Protocol/Internet Protocol (TCP/IP), User Datagram Protocol (UDP), Lightweight Directory Access Protocol (LDAP), and the Message Queue (MQ) family of network protocols.

Network 120 is configured to allow communication between user computing device 140, server 130, network support resource computing device 150, and one or more printing devices within system 100, between the printing devices themselves, or between one or more other devices or systems and system 100. Such communications may include commands, requests, or data corresponding to documents, printing-device errors, or other data.

Figure 2:
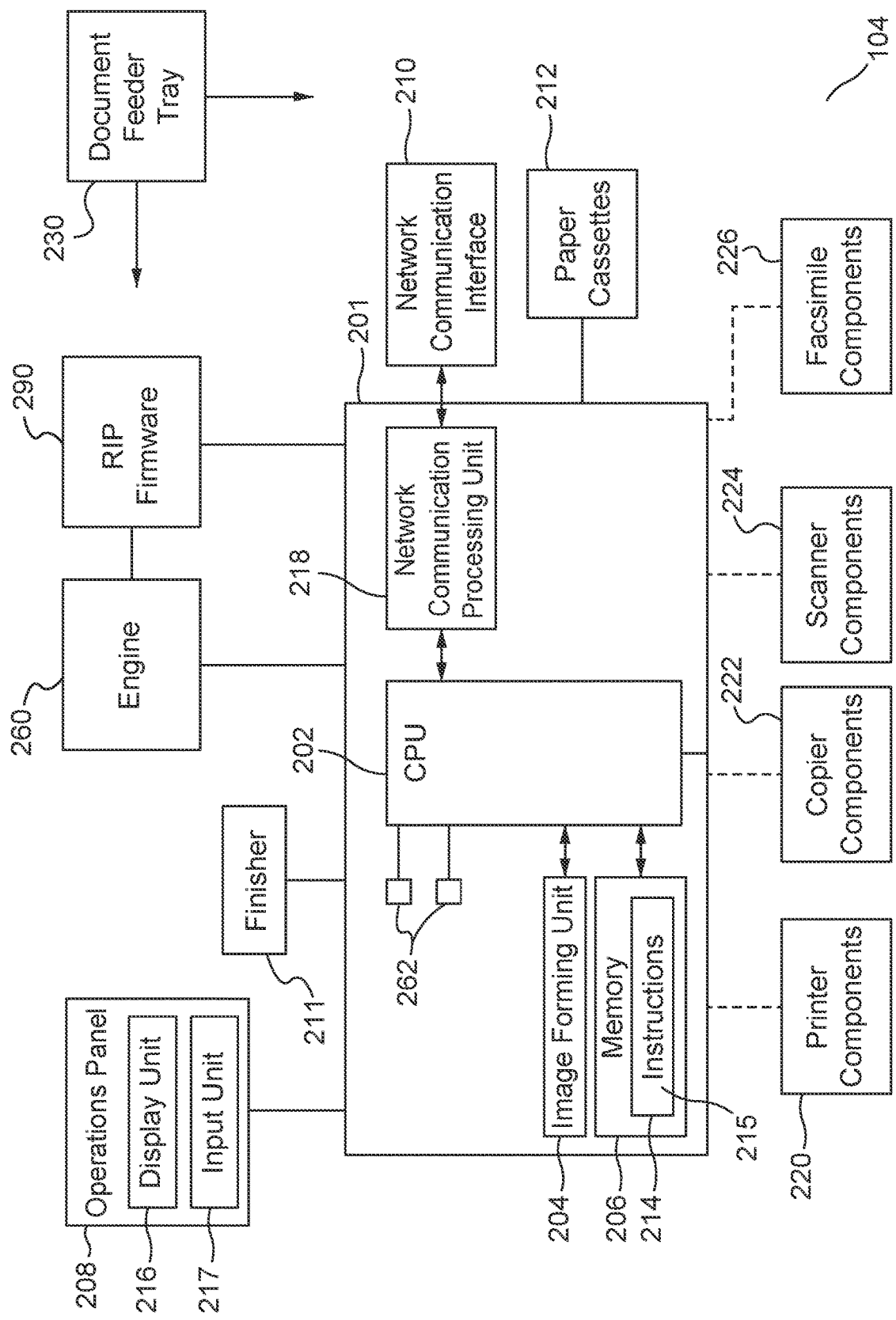
FIG. 2 shows a block diagram of a printing device according to an embodiment.

Referring now to FIG. 2, there is shown a block diagram of components of a printing device according to the disclosed embodiments. With reference to FIGS. 1-2, a printing device, e.g., any of printing devices 102A, 102B, 104A, 104B, 106, and 110, may contain hardware and software components configured to enable printing, scanning, copying, faxing, and other operations. In the disclosure of FIG. 2, printing device 104A may be referred to for illustrative purposes. The architecture shown in FIG. 2 may apply to any multi-functional printing device or image forming apparatus that performs various functions, such as printing, scanning, storing, copying, and the like. As disclosed above, printing device 104A may send and receive data from analytical server 130 and other devices within system 100.

Printing device 104A includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104A, using computing platform 201, may be configured to perform various operations, such as scanning, copying, printing, receiving or sending a facsimile, or document processing. As such, printing device 104A may be a printing device or a multi-function peripheral including a scanner, and one or more functions of a copier, a facsimile device, and a printer. To provide these functions, printing device 104A includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104A also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like. Paper cassettes 212 supply paper to image the various components 220, 222, 224, and 226 to create the image formed surfaces on the papers. Paper cassettes 212 may include papers having various sizes, colors, composition, and the like. Paper cassettes 212 may be removed to refill as needed.

Document processor input feeder tray 230 may be the physical components of printing device 104A to receive papers and documents to be processed. A document is placed on or in document processor input feeder tray 230, which moves the document to other components within printing device 104A. The movement of the document from document processor input feeder tray 230 may be controlled by the instructions input by the user. For example, the document may move to a scanner flatbed for scanning operations. Thus, document processor input feeder tray 230 provides the document to scanner components 220. As shown in FIG. 2, document processor input feeder tray 230 may interact with engine firmware 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104A. For example, a storage location 214 may include data for running an operating system executed by computing platform 201 to support the components within printing device 104A. According to the disclosed embodiments, memory unit 206 may store the tokens and codes used in performing operations for printing device 104A. Memory unit 206 may also store one or more public lists of printer settings interfaces, accessible and modifiable by users of the printing device 104A.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104A to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104A to act as a printer, copier, scanner, and a facsimile device.

Printing device 104A also includes an operations panel 208, which may be connected to computing platform 201. Operations panel 208 may include a display unit 216 and an input unit 217 for facilitating interaction with a user to provide commands to printing device 104A. Display unit 216 may be any electronic video display, such as a liquid crystal display (LCD) for displaying printer settings interfaces and other menu options. Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104A.

Printing device 104A also includes network communication processing unit 218. Network communication processing unit 218 may establish a network communication using network 120, such as a wireless or wired connection with one or more other image forming apparatuses or analytical server 130. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104A. CPU 202 also may retrieve information stored in memory unit 206, such as settings for printing device 104A.

Printing device 104A also includes engine 260. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the toner onto paper during operations on printing device 104A.

In some embodiments, server 130 may send user account information, print jobs, and updates to firmware on printing device 104A. Engine 260 or RIP firmware 290 may be updated by firmware, which is a more recent version of the firmware installed on printing device 104A. The installation of a new firmware version, may result in additional errors or degradation of performance of printing device 104A. Execution of print jobs with incompatible printer settings states may also result in errors or degradation of performance of printing device 104A To this end, printing device 104A may include one or more sensors 262 that collect data and information to provide to computing platform 201 or CPU 202. Each sensor 262 may be used to monitor certain operating conditions of printing device 104A. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104A, or the print volume of the printing device over a period of time or other criteria. When a sensor 262 detects an operational issue or failure event, it may send a signal to CPU 202. CPU 202 may generate an error alert associated with the problem. The error alert may include an error code. Computing platform 201 may transmit the error alert along with the error code and a saved printer settings interface in the form of an error report. The error report may be transmitted to network support resource computing device 150 directly or via server 130, which may store an indicator of the report in association with a user account.

Display unit 216 may display information about applicable error codes and a short description of the error associated with the operational issue or failure event. Displayed information may include identification of a printer setting or settings that contributed to an error. Further, display unit 216 may display an instruction on how to proceed (operate) to resolve the error. For example, if a network error occurred, then the following message may be provided on operations panel 208: Reboot the device.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors may have software or firmware related causes. For example incompatible printer settings may result in conflicting software instructions. Firmware errors may result in improper receipt of print job data by network communication interface 210, etc. Display unit 216 may display the software or firmware-related error, any applicable error codes, and provide recommendations to address the error, such as reboot the device.

Memory unit 206 may store the history of failure events and occurred errors with a timestamp of each error. Printing device 104A communicates with network support resource computing device 150, and, or server 130 via network communication interface 210 by utilizing a network protocol, such as the ones listed above. In some embodiments, printing device 104A communicates through REST API, which allows the server 130 or network support resource computing device 150 to collect data from multiple devices via network 120. REST API and SOAP are application protocols used to submit data in different formats, such as files, XML messages, JSON messages, and the like. By utilizing applicable network communication protocols and application protocols, printing device 104A submits the applicable error code or codes and printer settings information in an error report. Network support resource computing device 150 collects error codes from individual devices and stores information in the database for further analysis. The database keeps data include device identification, timestamp, and error code.

Figure 3:
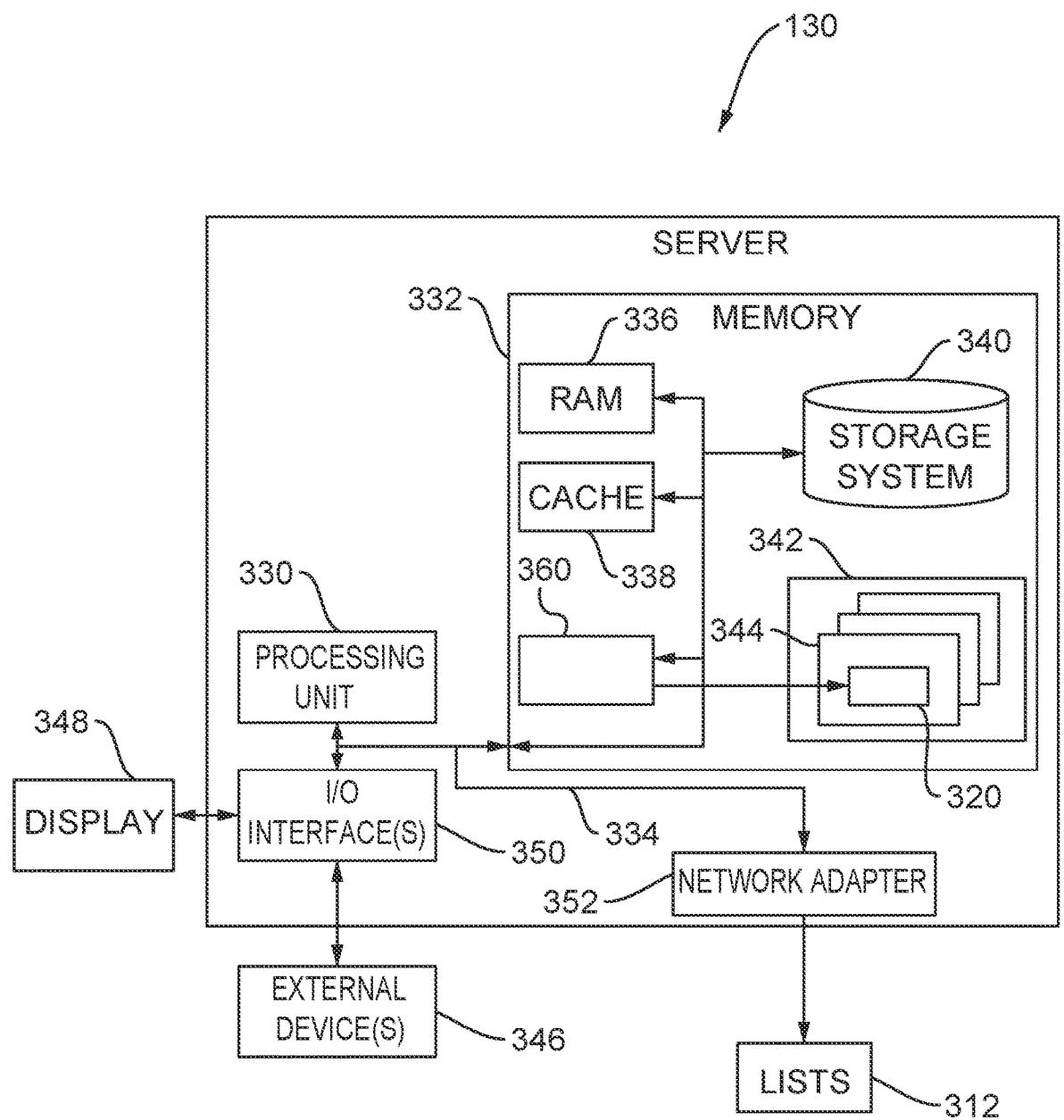
FIG. 3 shows a block diagram of a network support resource computer according to an embodiment.

Referring now to FIG. 3, there is shown a block diagram of server 130 according to the disclosed embodiments. With reference to FIGS. 1-3, a server 130 may communicate with and enable operation of printing devices 102A, 102B, 104A, 104B, 106, and 110. The components of server 130 may include, but are not limited to, one or more processors or processing units 330 and a server memory 332. A server bus 334 couples various server components including server memory 332 to processing unit 330. Server 130 may include a variety of computer readable media. Such media may be selected from any available media that is accessible by server 130, including non-transitory, volatile, and non-volatile media, removable and non-removable media. Server memory 332 could include one or more personal computing readable media in the form of volatile memory, such as random access memory (RAM) 336 or a cache memory 338. In some embodiments, a storage system 340 may be provided for reading from and writing to a non-removable, non-volatile magnetic media device, such as a hard drive.

Server memory 332 may include at least one program product or utility 342 having a set, or at least one, of program modules 344 that may be configured to perform the functions of the disclosed embodiments. A database 360 may include user account information 320 for use by program module 344 in performing functions of the disclosed embodiments. Program modules 344 may include, but are not limited to, an operating system, one or more application programs, other program modules, and program data. Each of the operating systems, one or more application programs, other program modules, and program data or some combination thereof, may include an implementation of a networking environment. Program modules 344 may perform the functions or methodologies of disclosed embodiments using the user account information 320 or other information in database 360. For example, a program module 344 in server 130 may receive and store in database 360 user requests to save printer settings interfaces and, or state of printer settings. Program module 344 may also receive requests for lists of saved printer settings interfaces for a user account and transmit the requested list to a printing device (e.g., printing device 104A) or a network support resource computing device 150.

Server 130 may communicate with one or more external devices 346, such as a keyboard, a pointing device, a stylus, a display 348, or any similar devices, such as a network card, modem, and the like. Display 348 may be a light emitting diode (LED) display, a liquid crystal display (LCD) display, a cathode ray tube (CRT) display, and the like. External devices 346 may enable server 130 to communicate with a printing device. Such communication may occur via input/output (I/O) interfaces 350. Alternatively, server 130 may communicate with one or more networks 120 such as a local area network (LAN), a general wide area network (WAN), or a public network via a network adapter 352. Server 130 may be coupled to network 120 via a wired or wireless connection. Network adapter 352 may communicate with the other components via bus 334.

Any combination of one or more computer readable media, for example, storage system 340, may be utilized. In the context of the disclosed embodiments, a computer readable storage medium may be any tangible or non-transitory medium that contains, or stores, a program, such as program product 342, for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

In some embodiments, server 130 may store account-specific lists of printer settings interfaces for printing devices within system 100. Lists of printer settings interfaces saved in database 360 in association with user accounts may be forwarded to one or more printing devices through network adapter 352 when instructed by processing unit 330. Processing unit 330 may execute instructions stored in server memory 332 to configure server 130 to perform the steps and functions disclosed below. Specifically, instructions stored in program modules 344 may determine how to access and transmit lists of printer settings interfaces and associated user account or error reporting information throughout system 100 based on the processes disclosed below.

Each set of printing devices, such as printing devices 102A and 102B and printing devices 104A and 104B, may be related to each other by a model and firmware version. For example, printing devices 102A and 102B may be the same model of device while running the same version of firmware. As such, some printing devices within system 100 may have the same or nearly the same printer settings interfaces and printer settings. Other printing devices may have fewer or additional printer settings interfaces according to the level of functionality. Not all printer settings interfaces may be compatible across all models of printing devices within system 100. Thus, server 130 may maintain a number of lists of printer settings devices for any given user account. As an example, a user account may have a favorites list for use with printing devices 102A and 102B, but may have a different favorites list for printing device 104A and yet another for printing device 110.

Figure 4:
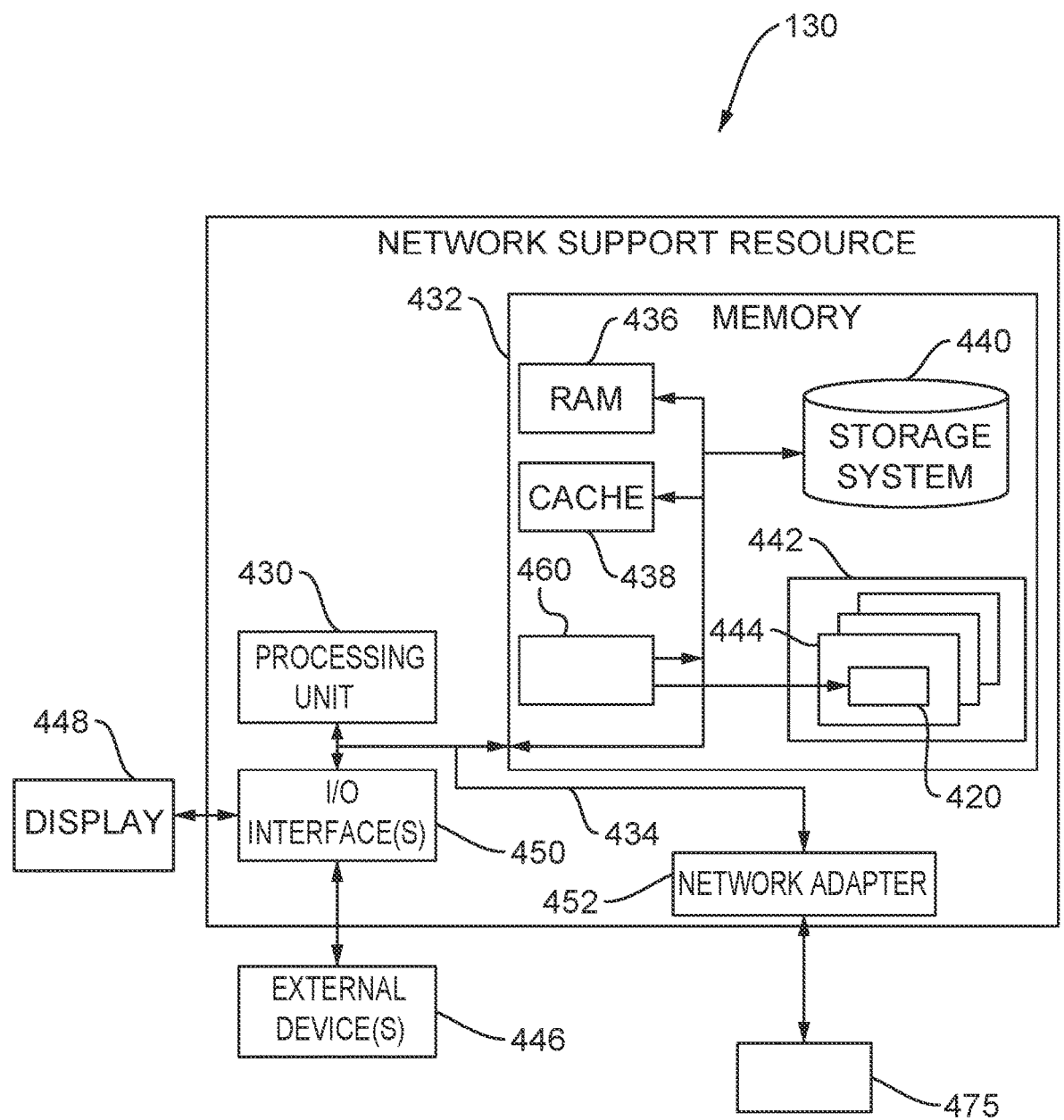
FIG. 4 shows a block diagram of a server according to an embodiment.

Referring now to FIG. 4, there is shown a block diagram of network support resource computing device 150 according to the disclosed embodiments. With reference to FIGS. 1-4, the network support resource computing device 150 may transmit and receive data from any of the devices in system 100 such as printing devices 102A, 102B, 104A, 104B, 106, and 110, server 130, and, or user computing device 140. The components of network support resource computing device 150 may by substantially similar to those discussed with reference to server 130 in FIG. 3.

The network support resource computing device 150 components may include, but are not limited to, one or more processors or processing units 430 and a memory 432. A bus 434 couples various components including memory 432 to processing unit 430. Network support resource computing device 150 may include a variety of computer readable media. Such media may be selected from any available media that is accessible by network support resource computing device 150, including non-transitory, volatile, and non-volatile media, removable and non-removable media. Memory 432 could include one or more personal computing readable media in the form of volatile memory, such as random access memory (RAM) 436 or a cache memory 438. In some embodiments, a storage system 440 may be provided for reading from and writing to a non-removable, non-volatile magnetic media device, such as a hard drive.

Memory 432 may include at least one program product or utility 442 having a set, or at least one, of program modules 444 that may be configured to perform the functions of the disclosed embodiments. A database 460 may include error reports 320 for use by program module 444 in performing functions of the disclosed embodiments. Program modules 444 may include, but are not limited to, an operating system, one or more application programs, other program modules, and program data. Each of the operating systems, one or more application programs, other program modules, and program data or some combination thereof, may include an implementation of a networking environment. Program modules 444 may perform the functions or methodologies of disclosed embodiments using the collected error reports 420 or other information in database 460. For example, a program module 444 in network support resource computing device 150 may receive and store in database 460 error reports and requests for technical support in response to technical failures by printing devices within the system 100.

Network support resource computing device 150 may communicate with one or more external devices 446, such as a keyboard, a pointing device, a stylus, a display 448, or any similar devices, such as a network card, modem, and the like. Display 348 may be a light emitting diode (LED) display, a liquid crystal display (LCD) display, a cathode ray tube (CRT) display, and the like. External devices 446 may enable network support resource computing device 150 to communicate with a printing device or server 130. Such communication may occur via input/output (I/O) interfaces 450. Alternatively, network support resource computing device 150 may communicate with one or more networks 120 such as a local area network (LAN), a general wide area network (WAN), or a public network via a network adapter 452. Network support resource computing device 150 may be coupled to network 120 via a wired or wireless connection. Network adapter 352 may communicate with the other components via bus 434.

Any combination of one or more computer readable media, for example, storage system 440, may be utilized. In the context of the disclosed embodiments, a computer readable storage medium may be any tangible or non-transitory medium that contains, or stores, a program, such as program product 442, for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

In some embodiments, network support resource computing device 150 may store error reports associated with printing devices within system 100. Error reports in database 460 may be received from one or more printing devices through network adapter 452 and stored when instructed by processing unit 430. Processing unit 430 may execute instructions stored in memory 432 to configure network resource computing device 150 to perform the steps and functions disclosed below. Specifically, instructions stored in program modules 444 may determine how to receive, organize, store, and access error reports. Error reports may be stored in a queue prior to processing and entry in the database 460. The error reports may be stored in association with a user account that initiated the print job.

Figure 5:
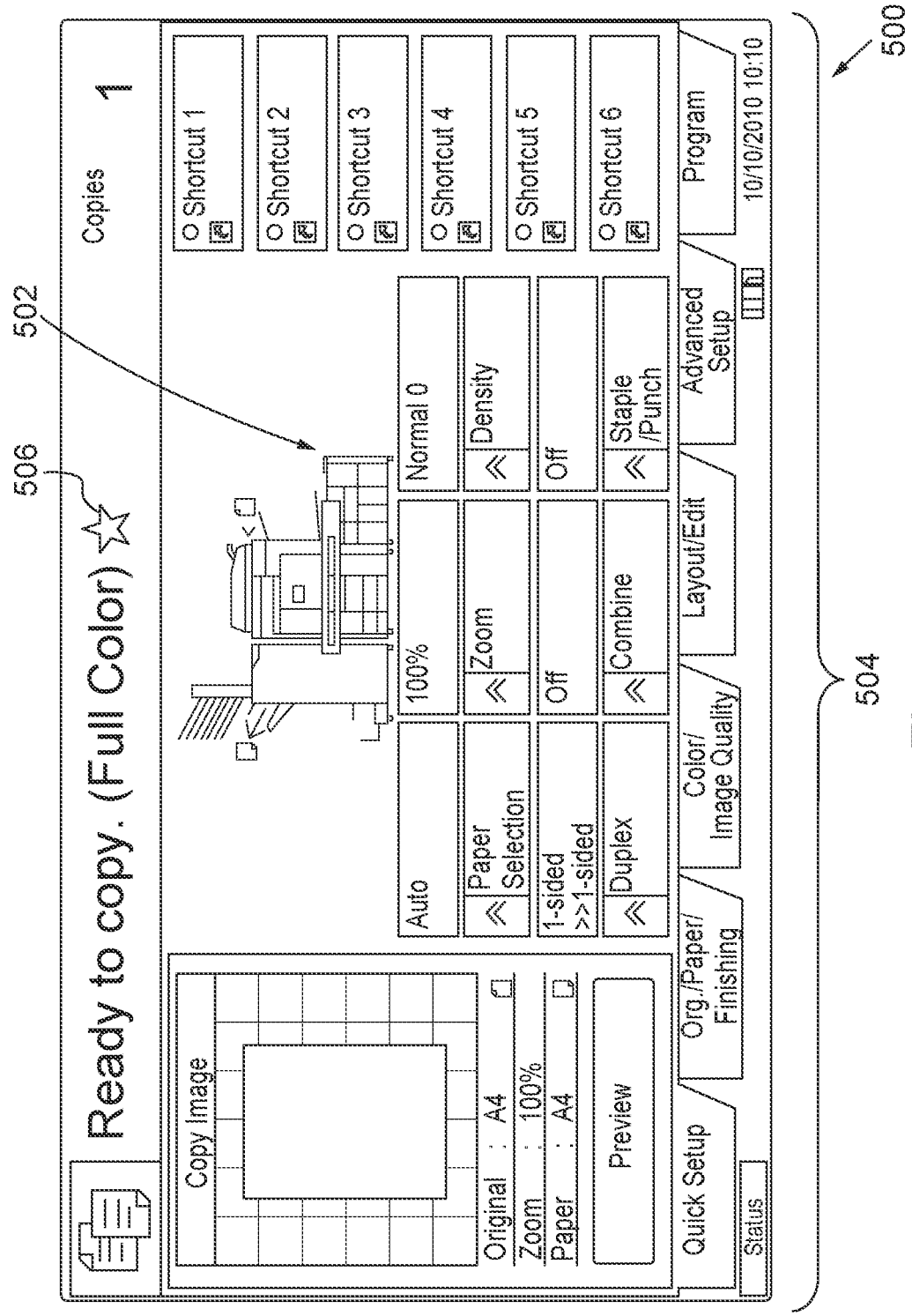
FIG. 5 shows a block diagram depicting an exemplary printer settings interface according to an embodiment.

Referring now to FIG. 5, there is shows an exemplary printer settings interface according to an embodiment. With reference to FIGS. 1-5, a printer settings interface 500 for a copy function of a printing device such as printing device 106 may have a number of printer settings with state options. A printer settings interface 500 is a graphical user interface or GUI, providing a visual representation of parameters known as printer settings, which may be used to modify print job output of the printing device 106. Each printer settings interface 500 is presented to a user via the display unit 216. Users may select from the available printer settings 502 using input unit 217 which may be integrated with display unit 216 such as in a touchscreen configuration, or may be separate therefrom.

Printer settings 502 may be parameters or flags provided to CPU 202 as instructions for modifying output of a file. Each printer settings 502 may have multiple states some of which may be pre-selected based on print job requirements. Other printer settings, those which a user may manipulate or modify, may be referenced as configurable options. In the example illustrated in FIG. 5, the "zoom" printer setting is shown with the state of "100%" indicating that the printing device 105b should output the file at 100% of its digital size. Changing this configurable option to display a state of "50%" will cause the printing device 106 to put the file at half of its digital size. Some printer settings 502 may be mutually exclusive or mutually inclusive. Thus, the selection of one state for a configurable option may lock-in or prevent alteration of the state of a second option that might otherwise be configurable. For example, selection of a particular paper-size may necessitate the use of a particular paper feeding tray and thus prevent the use of double-sided printing options. Initiation of a print job results in the provision of an instruction including all applicable printer settings is sent to the CPU 202 to begin output of the print job.

A save button 506 or favorites button may be displayed somewhere on the printer settings interface 500. Interacting with this save button 506 via an input unit 217 instructs the CPU 202 to add the printer settings interface 500 to a favorites list. In an embodiment, saving the printer settings interface 500 may be the storage of the interface tree path, memory address, file system path, or other address of the printer settings interface 500 in a data structure representing a list of printer settings interfaces. In this manner, the saved printer settings interface 500 may be quickly accessed in the future via a shortcut button in a favorites list, without requiring a user to navigate through multiple layers of an interface tree. In other embodiments, saving the printer settings interface 500 may include both the saving of the address of the interface as well as the state of printer settings 502 at the time of saving. Accessing the saved printer settings interface 500 via shortcut of a favorites list may result in not only the display of the printer settings interface 500 but also the pre-selection of the saved state of available printer settings 502.

Various link buttons 504 distributed throughout the printer settings interface 500 may provide access to other printer settings interfaces, such as sub-interfaces. Link buttons 504 may be selectable images, hyperlinks, tabs, or the like.

Figure 6:
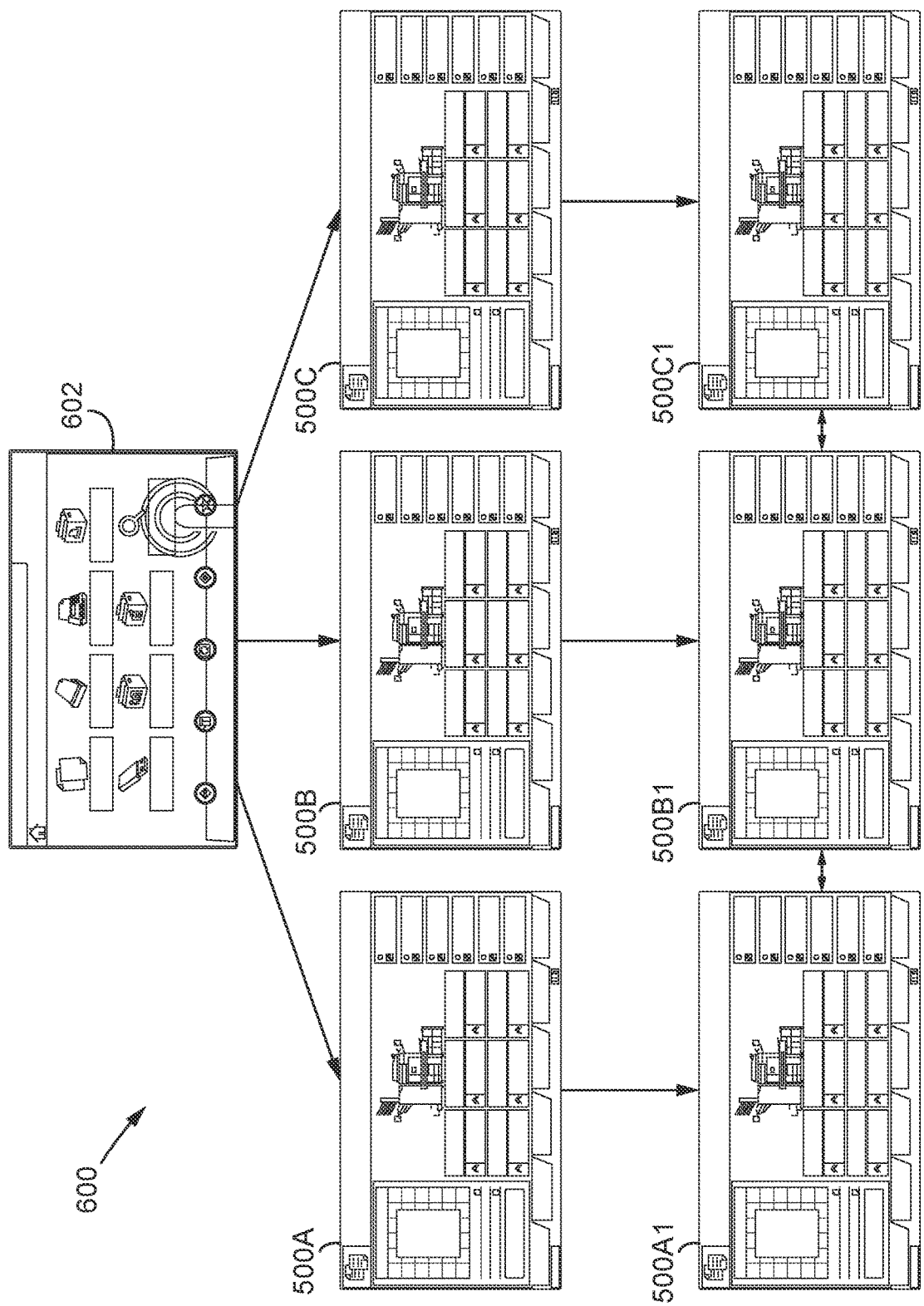
FIG. 6 shows a block diagram depicting an exemplary link structure for printer settings interfaces according to an embodiment.
Figure 8:
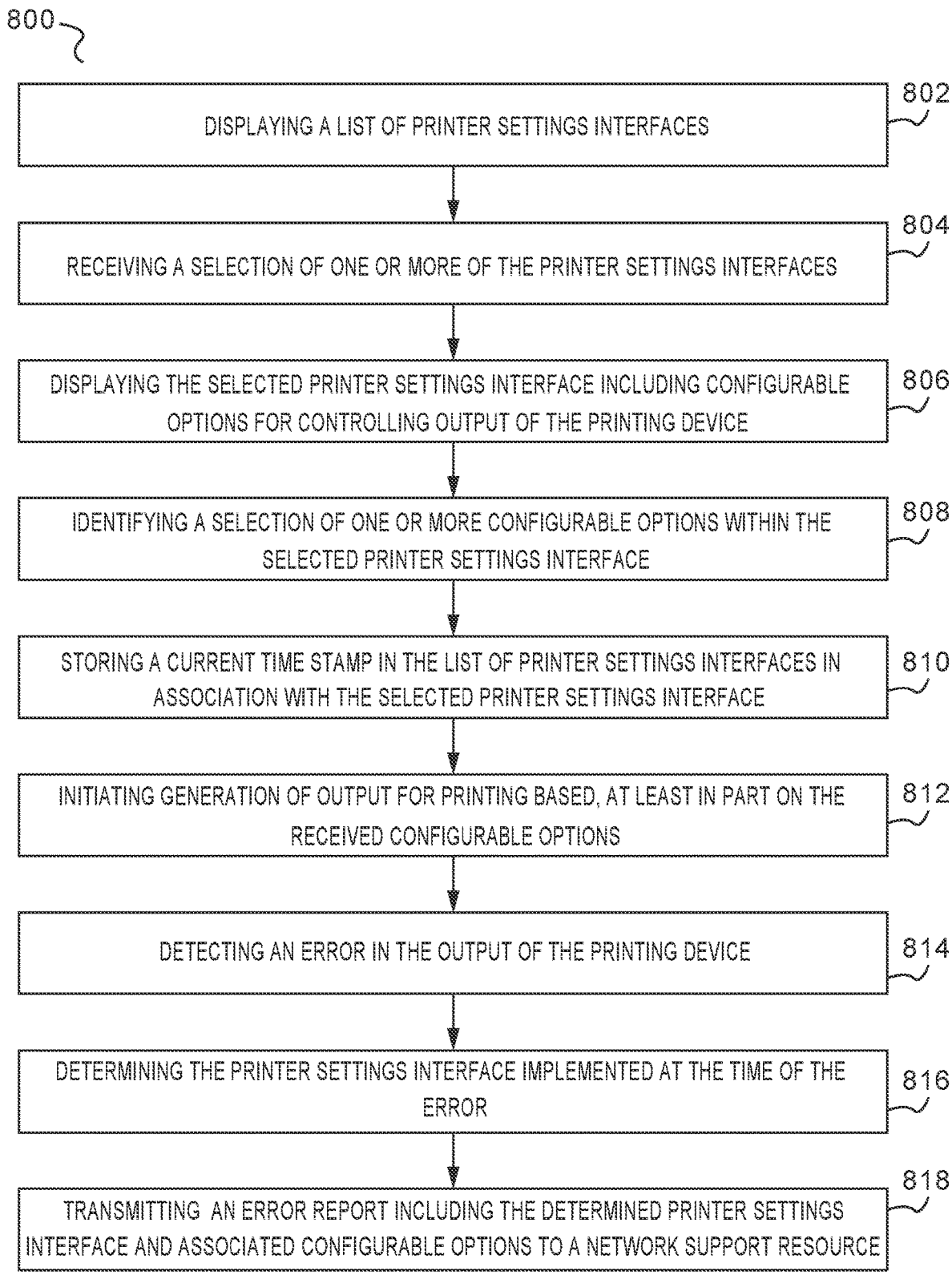
FIG. 8 shows a process flow diagram illustrating an exemplary method for reporting printing errors to a network support resource using a public list of saved settings according to an embodiment.

Referring now to FIG. 6 there is shown a block diagram of an exemplary link structure for printer settings interfaces. With reference to FIGS. 1-6, printer settings interfaces 500A-C etc., may be linked in a nested structure such as a tree architecture. A main menu interface 600 may be the top node of the interface tree, and may provide access to various printer settings interfaces and other service options. For example, the main menu interface 600 may provide access to a search function and an error reporting function, in addition to enabling access to the printer settings interfaces.

Printer settings interfaces 500A, 500B, 500C may be primary or "home" screens associated with different printing functions. For example, 500A may be associated with copying functionality, while 500B may be associated with faxing functionality, etc. Each of these printer settings interfaces may provide different printer settings and configurable options according to the associated functionality. Additional printer settings interfaces or sub-interfaces may be accessible via link buttons 504 on each printer settings interface. Although the tree link structure is depicted in a vertical tree configuration, the links between printer settings interfaces are not limited to vertical relationships. Some printer settings interfaces may be applicable to multiple printing device 106 functions, and thus may be accessible across branches of the interface tree.

Because some printer settings interfaces may be nested, i.e. several nodes down a branch of the tree, it may be difficult for users to recall how to reach these interfaces and their printer settings. By saving often used, but hard to reach, printer settings interfaces to a list, users may quickly access these interfaces in the future. Save buttons 506 may be displayed on each printer settings interface 500A-C etc., facilitating quick storage of an interface address.

Saved or favorited printer settings interfaces may be organized in a data structure such as table, tree, list or other structure. For ease of explanation, the structure is described herein as a table. The data table may include a display name of the printer settings interface, the address or path at which the printer settings interface is located, any saved settings, and a date stamp for the last use of the saved printer settings interface. The address may be an address in memory containing the data needed to render and implement the printer settings interface functionality. The time stamp may be a time or date at which the printer settings interface was last accessed.

In some embodiments, access of the printer setting interface through the standard navigation rather than the list of saved printer settings interfaces, may also result in an update to the time stamp saved in the data table. For example, upon execution of a print job, the processor may determine whether the currently displayed printer settings interface exists in the list of saved printer settings interfaces, i.e., does a data table entry exist for the current interface. If the current printer settings interface does exist in the data table as a saved printer settings interface, then the associated time stamp is updated to the current time, even though the printer settings interface was accessed through conventional navigation. This functionality may further increase the capability of a printing device to detect the printer settings in place at the time of a technical failure, even if the printer settings interface in use at the time was not selected through the list.

Referring now to FIG. 7, there is shown, a block diagram illustrating an exemplary error report for a technical failure incident. With reference to FIGS. 1-7, a printing device such as any of printing devices 102A, 102B, 104A, 104B, 106, or 110, may generate an error report 700 in response to experiencing a technical failure during execution of a print job. The error report 700 may be transmitted to the network support resource computing device 150 and optionally server 130. Information contained in the error report 700 may be used to identify the cause of a technical failure. Similarly, the information used in the error report may be used to recreate the technical failure for purposes of identifying and resolving the issue.

In the error report, the printing device may use an error code to indicate the type of error or technical failure that occurred during execution of a print job. An error code may be used instead of textual descriptions. Error codes may correspond to the same error across different printing devices. When an error is detected in a printing device, the associated error code along with additional information is provided to network support resource computing device 150.

Error report 700 may show some examples of error codes 702 along with information for use by network support resource computing device 150. Error codes 702 may use different designations to indicate the type of error that is detected. Further, error codes 702 may distinguish the type of error or where in the printing device the error occurred. For example, error codes C0001 and C0002 may refer to hardware errors while error codes CF001 and CF002 may refer to software errors encountered while executing the print job. Each error code 702 may have a date of occurrence 704. Error report 700 also includes a description 706 for each error code 702. This description should apply to the other printing devices under observation.

For example, error code C0001 refers a hardware error on the printing device while error code C0002 refers to a fuser issue within the printing device. Error code C0001 refers to a hardware error on printing device 102A as well as printing device 102B. Further, error code CF001 may refer to a misprint condition while error code CF002 may refer to a color correction problem within the printing device. These may be software errors in that an upgrade to the code may fix these problems.

Error code CM001 may refer to another type of error, not really attributable to just hardware or software. It also may reflect a major error that prevents usage of the printing device at all. For example, error code CM001 may refer to an operating system crash that takes the printing device offline.

Error codes 702 may be sent to network support resource computing device 150 for a single printing device 102B using data 122B. Referring to dates of occurrence 704, it may be seen that two errors occurred on Dec. 15, 2020, while other errors occurred on December 20, 27, and 28. It appears as though errors occur at a rate of 5 every two weeks. Network support resource computing device 150 may collect error information for any period of time. Alternatively, network support resource computing device 150 may retrieve the error logs within each printing device that includes such information to determine what errors occur in a printing device and how often.

Error report 700 may include firmware information 708 of a printing device reporting the error. Some error codes 702 may be associated with particular firmware updates, which may include hardware and software. As such, the network support resource computing device 150 may track the occurrence of different types of technical failures with relation to firmware changes.

Error codes 702 also may be associated with settings information 710. As discussed above, incompatible settings selections may result in technical failures. If the printer settings in use at the time of technical failure have been previously saved as an entry in the list of printer settings interfaces. Alternatively, if the printer settings were not saved as a printer settings interface prior to the technical failure, then a user may reenter the printer settings after the technical failure and save the configuration of the printer settings interface to the list. In either case, technical failure will not result in the loss of printer settings configuration. For example, if a user selects the printer settings interface from a list and then executes the print job using the displayed interface with prepopulated printer settings, then the state of printer settings at the time of technical failure will be available in memory 205. The printing device may attach this information to an error report as settings information 710. Settings information 710 may thus include the state of printer settings and optionally, the printer settings interface in use at the time of technical failure Referring now to FIG. 8, there is shown a process flow diagram illustrating an exemplary method 800 for reporting printing errors to a network support resource using a public list of saved settings. With reference to FIGS. 1-8, public favorites lists or lists of shortcuts to printer settings interfaces may be stored locally in a memory 206 of a printing device, e.g., printing device 104B. A public favorites list may be accessible and modifiable by any user of the printing device without requiring user login. Alternatively, the public list may be accessible and modifiable by any user of the system 100 and may require user login to the server 130, but is not stored in association with any specific user account.

At step 802, the printing device may display a list of printer settings interfaces. For example, a display unit 216 of printing device 104B may display a list of one or more printer settings interfaces available for user selection. The list of printer settings interfaces may be a menu list or may be a set of shortcuts such as the shortcuts of printer settings interface 500 in FIG. 5. The list of printer settings interfaces may provide a display name or other identifier for each of the saved printer settings interfaces. Saved or "favorited" printer settings interfaces within the list may be displayed in any order including chronological, alphabetical, etc.

A data structure may be used to store and organize the elements of the list of printer settings interfaces. Display names or identifiers are stored in the data structure memory unit 206 in association with an address of data needed to render and enable functionality of a printer settings interface. The address may be an address in memory, a file path, etc. Each node of the data structure or line in a data table may include the display name and address of the printer settings interface and optionally one or more preferred states for configurable options within the group of available printer settings. Displaying the list of printer settings interfaces may require the CPU 202 or other processing unit to access the list data structure in memory unit 206 and retrieve the display names from each node, or the entries in a "display name" column of a table, and pass these entries to display unit 216.

At step 804, the printing device may receive a selection of one or more of the printer settings interfaces in the list. For example, the input unit 217 of the printing device 104B may receive user input indicating a selection of one of the printer settings interfaces displayed via the display unit 216. The input unit 217 may receive the user input via a keyboard, keypad, touchscreen, track ball. Mouse, verbal command, or other input means and may provide the input to a processing unit such as CPU 202, which may interpret the input to determine what selection has been made. The CPU 202 passes an instruction to memory 205 to retrieve data needed to render the selected printer settings interface. More specifically, the CPU 202 may access the data table or data structure used to store the list of printer settings interface information, and may retrieve the address associated with the selected display name. The CPU 202 may access the file path, memory address, or other address to obtain data needed to display and enable functionality of the selected printer settings interface.

In some embodiments, this may include retrieving data for the preferred state of configurable options associated with the printer settings interface. The CPU 202 may obtain this information from the data table or data structure and may pass it to display unit 216 so that these printer settings may be displayed in the preferred state.

At step 806, the printing device may display the selected printer settings interface including configurable options for controlling output of the printing device. For example, the display unit 216 of printing device 104B may display the selected printer settings interface for user review. The displayed selected printer settings interface may include prepopulated states for one or more configurable options. For example, double siding may be set to an "on" position if the configurable option was set to that state at the time the printer settings interface to the list. Not all configurable options may have been set to a particular state at the time of saving the printer settings interface to the list. In such instances, configurable options with unspecified states are displayed in a default or neutral state.

At step 808, the printing device may identify a selection of one or more configurable options within the selected printer settings interface. For example, input unit 217 of the printing device 104B may receive user input indicating a selection of a state of a configurable option and the CPU 22 may identify this selection as a change in state of a configurable option. Alternatively, the CPU 202 may identify the prepopulated states of the configurable options saved in association with the printer settings interface as the desired selection. Users may toggle or modify the state of configurable options whether prepopulated after the list of printer settings interfaces selection, or in a default state. Printer settings that are unalterable, i.e., not configurable options, remain in their necessary state.

At step 810, the printing device may store a current time stamp in the list of printer settings interfaces in association with the selected printer settings interface. For example, the CPU 202 of printing device 104B may update the data table storing the list of printer settings interface data to include a current time stamp. The current time stamp may be derived from a CPU clock or other time keeping means of the printing device. This may provide the printing device 104B with a time at which the printer settings interface was last accessed.

At step 812, the printing device may initiate generating output for printing based, at least in part on the received configurable options. For example, CPU 202 of the printing device 104B may use the printer settings states as instructions for constraining or modifying the spooled print job and may pass the modified job to finisher 211 for output.

At step 814, the printing device may detect an error in the output of the printing device. For example, finisher 211 of printing device 104B may experience a malfunction and may signal to CPU 202 that an error has occurred. Alternatively, or in addition, CPU 202 may encounter a problem when constraining or modifying the spooled print job according to the selected states of printer settings. Errors may occur due to paper handling issues, firmware bugs, incompatible printer settings selection, spooling software error, interface software error, etc.

At step 816, the printing device may determine the printer settings interface implemented at the time of the error. For example, CPU 202 of printing device 104B may check the time stamps associated with saved printer settings interfaces within the data table to determine if one of the saved printer settings interfaces was in use at the time of the error. The CPU 202 may identify the time stamp saved during step 810 and thus determine that the selected printer settings interface was in use at the time the error occurred.

At step 818, the printing device may transmit an error report including the selected printer settings interface implemented at the time of the error, and associated configurable options to a network support resource. For example, the CPU 202 of printing device 104B may generate an error report 700 and transmit, via network communication interface 210, to network support resource computing device 150 for further action. The error report may contain information about the type of error that occurred, an error code, a firmware or software edition for the printing device, and a list of printer settings in use at the time of the error. When fatal errors occur in printing devices, the failure often results in a volatile memory and, or reboot of the printing device, making it difficult or impossible to determine the state of printer settings at the time of failure. However, the presence of saved printer settings in a printer settings interface within non-volatile memory, enables the preservation or easy recollection of printer settings in place during a technical failure. The addition of the printer settings states may improve the network support resource diagnostic capabilities or response time. Thus, after the network support resource computing device 150 receives the error report and analysis is performed, error correction and bug fixes may be applied quickly.

Figure 9:
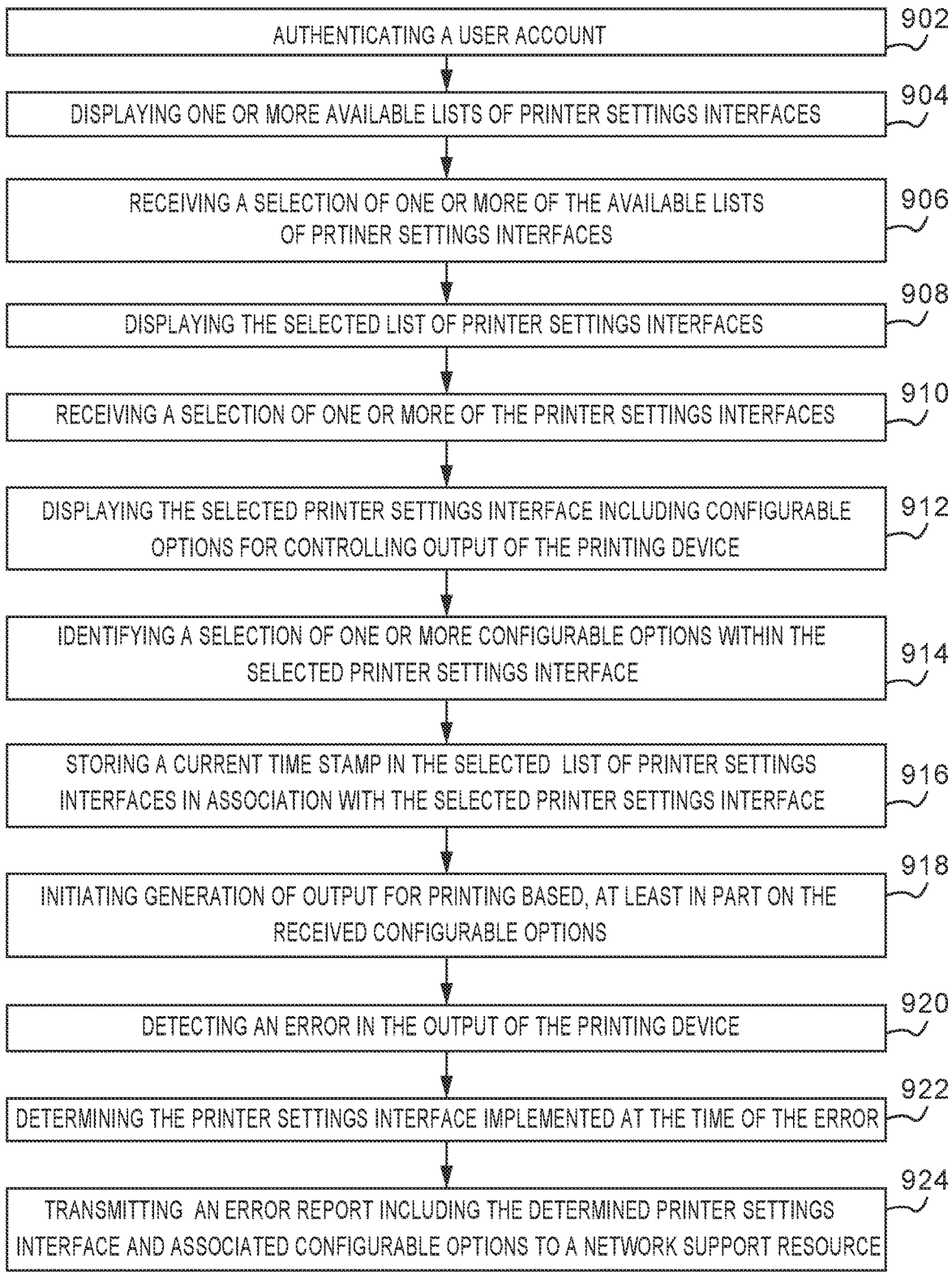
FIG. 9 shows a process flow diagram illustrating an exemplary method for reporting printing errors to a network support resource using an account-specific list of saved settings according to an embodiment.

FIG. 9 shows a process flow diagram illustrating an exemplary method 900 for reporting printing errors to a network support resource using an account-specific list of saved settings according to an embodiment. With reference to FIGS. 1-9, an account-specific favorites lists or list of shortcuts to printer settings interfaces may be stored in a memory 332 of server 130 in association with an account of a user of system 100. The account-specific favorites list may be accessible and modifiable by only by an authenticated user of the account. Authentication may be achieved through the provision of user credentials at the printing device, e.g. printing device 104B, and the transmission of an authentication request message to the server 130. Alternatively, authentication may be achieved through the provision of user credentials at a user computing device 140. An authentication request message including the user credentials, and the print job to server 130, such that the user is authenticated when they engage with a printing device.

In some embodiments, the printing device at which a user saves printer settings interfaces to an account-specific list is not necessarily the same printing device at which the method 900 is executed. For example, a user of printing device 110 may save one or more printer settings interfaces to an account-specific list. Later, the user may begin a print job on printing device 104B and may authenticate at that printing device. The account-specific list of printer settings interfaces may be displayed and used at printing device 104B. Thus, account-specific lists of printer settings interfaces are portable between printing devices within system 100. Because not all printing devices within system 100 may offer the same functionality, printer settings interfaces may vary between devices. As such, server 130 may store multiple account-specific lists which may overlap. While the account-specific lists may be available at any device, not all printer settings interfaces may be available for each device due to compatibility issues.

In step 902, the printing device may authenticate a user account using a user credential. For example, input unit 217 of printing device 104B may receive the input of a user credential such as a password or personal identification number (PIN). The user credential may be transmitted using network communication interface 218 to server 130 in an authentication request message. The server 130 may compare the credential against stored user account information. If the user is authenticated, then an approval and the account-specific list of printer settings interfaces is transmitted to the printing device 104B in an authentication approval message.

In step 904, the printing device printing device may display an option for an account-specific or public printer settings interface. For example, display unit 216 of printing device 104B may display a prompt or selection button by which a user may select which list or lists the user would like to have displayed. This option may be provided as part of a main menu, an account specific interface, or the like.

In step 906, the printing device may receive a selection of a list of printer settings interfaces. For example, input unit 217 of printing device 104B may receive user input via keypad, touchscreen, keyboard, or the like, indicating a selection of one or more of the available lists of printer settings interfaces. The available lists may include both a public list saved locally to the printing device, and an account-specific list imported from the server 130.

Step 908 may proceed in substantially the same manner as step 802 of method 800.

Step 910 may proceed in substantially the same manner as step 804 of method 800.

Step 912 may proceed in substantially the same manner as step 806 of method 800.

Step 914 may proceed in substantially the same manner as step 808 of method 800.

Step 916 may proceed in substantially the same manner as step 810 of method 800.

Step 918 may proceed in substantially the same manner as step 812 of method 800.

Step 920 may proceed in substantially the same manner as step 814 of method 800.

Step 922 may proceed in substantially the same manner as step 816 of method 800.

Step 924 may proceed in substantially the same manner as step 818 of method 800. Transmission of the error report to the network support resource computing device 150 may further include the system name for the user account with which the account-specific list is associated. For example, the CPU 202 of printing device 1408 may determine whether the printer settings interface was selected from an account-specific list of printer settings interfaces. If the printer settings interface was selected from the account-specific list, the error report may be amended to include the user account associated with the account-specific list.

Figure 10:
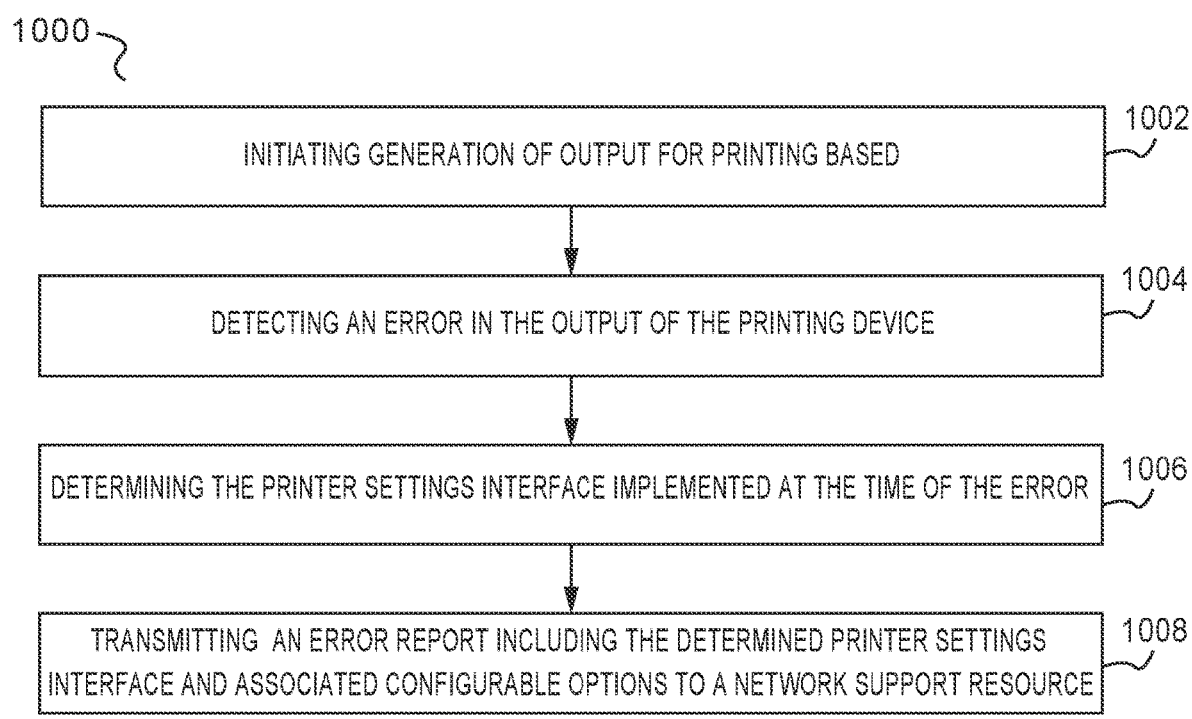
FIG. 10 shows a process flow diagram illustrating an exemplary method for generating and reporting printing errors to a network support resource using an account-specific list of saved settings according to an embodiment.

Referring now to FIG. 10, there is shown a process flow diagram illustrating an exemplary method 1000 for reporting printing errors to a network support resource using saved printer settings. With reference to FIGS. 1-10, a printing device such as printing device 104B may detect errors in the output of print jobs, and may access memory 206 to determine whether any of the saved printer settings interfaces were active at the time of the error. An error report may be generated including the printer settings interface active at the time of the error if a timestamp in data table indicates that one of the saved printer settings interfaces was active at the time of the error. This may occur regardless of whether the list of printer settings interfaces was used to access the printer settings interface at issue.

Step 1002 may proceed in substantially the same manner as step 812 of method 800 or step 918 of method 900. However, step 1000 may proceed using a selection from a printer settings interface that was accessed via conventional navigation methods. For example, the user may have selected a series of links on the main menu interface and other printer settings interfaces to reach the current printer settings interface.

Step 1004 may proceed in substantially the same manner as step 814 of method 800 or step 920 of method 900.

Step 1006 may proceed in substantially the same manner as step 816 of method 800 or step 922 of method 900. For example, the CPU 202 of printing device 104B may access the data table stored in memory 206 to determine whether the time of the detected error matches or is close to any time stamps associated with saved printer settings interfaces. If the comparison yields a match or near match, the CPU 202 may determine that the saved printer settings interface associated with the identified time stamp was implemented at the time of the detected error.

Step 1008 may proceed in substantially the same manner as step 818 of method 80 or step 924 of method 900.

Embodiments of the invention provide for a number of advantages. For example, by requiring a user to enter a passcode into a service provider application to be provisioned with access data, the user confirms which application is to be provisioned and the user's use of a particular user device can provide for a second factor of authentication before provisioning occurs. Also, compared to the situation where the user device would need to separately communicate with each of the authorizing computer, the processing computer, and service provider computer, embodiments of the invention reduce the number of communications by not requiring the user device to communicate directly with the processing computer. Lastly, as noted above, the methods according to embodiments can be used to provision service provider applications, across different devices, as well as to Web applications hosted on Web services, thereby making the methods according to embodiments very versatile.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents. For example, although the described embodiments mention the use of electronic records in order to assess a risk level of an action, an electronic record can also be used to access data or other services. For example, electronic records may be used to gain access to a location or service (e.g., a train ride or concert). In this example, the electronic record may include a transaction record which indicates that a ticket has been associated with an account.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A printing device comprising:
a processor;
a display;
an input device;
a network communication interface;
a computer readable medium, coupled to the processor, the computer readable medium comprising code, executable by the processor to implement a method comprising:
displaying, by the display, a list of printer settings interfaces;
receiving, via the input device, a selection of one or more of the printer settings interfaces in the list, wherein each of the printer settings interfaces is stored in the computer readable medium or stored in a memory, and wherein the printer settings interfaces are associated with a user account, in response to receiving a request to store the printer settings interface being displayed at the time of the request;
displaying, by the display, the selected printer settings interface including configurable options for controlling output of the printing device;
identifying, via the processor, a selection of one or more configurable options within the selected printer settings interface;
storing, in the computer readable medium, a current time stamp, in the list of printer settings interfaces in association with the selected printer settings interface;
initiating, by the processor, generation of output for printing based, at least in part on the received configurable options;
detecting, by the processor, an error in the output of the printing device during printing operations;
determining, by the processor, the selected printer settings interface implemented at the time of the detected error that occurred during printing operations based on the current time stamp for the selected printer settings interface; and
transmitting, by the network communication interface, an error report including the selected printer settings interface and the received configurable options to a network support resource.

2. The printing device claim 1, wherein each of the printer settings interfaces is stored in the computer readable medium in association with the list, in response to receiving a request to store the printer settings interface being displayed at the time of the request.

3. The printing device of claim 2, wherein read and write permissions for the list of printer settings interfaces enable access for all users of the printing device.

4. The printing device of claim 1, wherein the configurable options control configuration of the printer output.

5. The printing device of claim 1, wherein the list of printer settings interfaces is associated with a user account, and each of the printer settings interfaces is stored in a memory in association with the list, in response to receiving a request initiated by a user logged into the user account, to store the printer settings interface being displayed at the time of the request.

6. The printing device of claim 5, wherein one or more of the printer settings interfaces in the list includes preferred selections for the configurable options, and wherein displaying, by the display, the selected printer settings interface includes displaying the configurable options set to the preferred selections.

7. The printing device of claim 5, wherein the memory is one or more of a network server, a removable memory, or the computer readable medium.

8. The printing device of claim 5, wherein the selected printer settings interface was stored in association with the list by a second printing device, in response to receiving a request to store the printer settings interface while the user logged into the user account at the second printing device.

9. A method for printer settings interface management comprising:
displaying, by a display of a printing device, a list of printer settings interfaces;
receiving, via an input device of the printing device, a selection of one or more printer settings interfaces in the list, wherein each of the printer settings interfaces is stored in the computer readable medium or stored in a memory, and wherein the printer settings interfaces are associated with a user account, in response to receiving a request to store the printer settings interface being displayed at the time of the request;

displaying, by the display, the selected printer settings interface including configurable options for controlling output of the printing device;

identifying, via a processor of the printing device, a selection of one or more configurable options within the selected printer settings interface;

storing, by a computer readable medium of the printing device, a current time stamp, in the list of printer settings interfaces in association with the selected printer settings interface initiating, by a processor of the printing device, generation of output for printing based, at least in part on the received configurable options;

detecting, by the processor, an error in the output of the printing device during printing operations;

determining, by the processor, the selected printer settings interface implemented at the time of the detected error that occurred during printing operations based on the current time stamp for the selected printer settings interface; and transmitting, by a network interface of the printing device, an error report including the determined printer settings interface and the received configurable options to a network support resource.

10. The method of claim 9, wherein each of the printer settings interfaces is stored in a computer readable medium in association with the list, in response to receiving a request to store the printer settings interface being displayed at the time of the request.

11. The method of claim 10, wherein read and write permissions for the list of printer settings interfaces enable access for all users of the printing device.

12. The method of claim 9, the configurable options control configuration of the printer output.

13. The method of claim 9, wherein the list of printer settings interfaces is associated with a user account, and each of the printer settings interfaces is stored in a memory in association with the list, in response to receiving a request initiated by a user logged into the user account, to store the printer settings interface being displayed at the time of the request.

14. The method of claim 13, wherein one or more of the printer settings interfaces in the list includes preferred selections for the configurable options, and wherein displaying, by the display, the selected printer settings interface includes displaying the configurable options set to the preferred selections.

15. The method of claim 13, wherein the memory is one or more of a network server, a removable memory, or a computer readable medium of the printing device.

16. The method of claim 13, wherein the selected printer settings interface was stored in association with the list by a second printing device, in response to receiving a request to store the printer settings interface while the user logged into the user account at the second printing device.

17. A printing device comprising:
a processor;
a display;
a network interface;
an input device;
a computer readable medium, coupled to the processor, the computer readable medium comprising code, executable by the processor to implement a method comprising:

receiving, via the input device, a selection of a public list of printer settings interfaces or an account-specific list of printer settings interfaces, wherein each of the printer settings interfaces in the public list is stored in the computer readable medium in association with the public list, in response to receiving a request to store the printer settings interface being displayed at the time of the request, and wherein the account-specific list of printer settings interfaces is associated with a user account, and each of the printer settings interfaces in the account-specific list is stored in a memory in association with the account-specific list, in response to receiving a request initiated by a user logged into the user account, to store the printer settings interface being displayed at the time of the request;

displaying, by the display, a selected list of printer settings interfaces;

receiving, via the input device, a selection of one or more of the printer settings interfaces in the list;

displaying, by the display, the selected printer settings interface including configurable options for controlling output of the printing device;

identifying, via the processor, a selection of one or more configurable options within the selected printer settings interface;

storing, in a computer readable medium, a current time stamp in the list of printer settings interfaces in association with the selected printer settings interface initiating, by the processor, generation of output for printing based, at least in part on the received configurable options;

detecting, by the processor, an error in the output of the printing device;

determining, by the processor, the selected printer settings interface implemented at the time of the detected error; and transmitting, by the network interface, an error report including the selected printer settings interface and the received configurable options to a network support resource.

18. The printing device of claim 17, wherein the computer readable medium comprises code to implement the method further comprising:

determining, by the processor, whether the printer settings interface was selected from an account-specific list of printer settings interfaces; and in response to determining that the printer settings interface was selected from the account-specific list, updating the error report to include the user account associated with the account-specific list.

19. The printer device of claim 17, wherein one or more of the printer settings interfaces in the account-specific list includes preferred selections for the configurable options, and wherein displaying, by the display, the selected printer settings interface includes displaying the configurable options set to the preferred selections.

20. The printing device of claim 17, wherein the selected printer settings interface was stored in association with the account-specific list by a second printing device, in response to receiving a request to store the printer settings interface while the user logged into the user account at the second printing device.

* * * * *